(12) United States Patent
Buhagiar

(10) Patent No.: US 11,034,326 B2
(45) Date of Patent: Jun. 15, 2021

(54) BRACKET FOR MOUNTING AN ANCHOR PRETENSIONER AND A RETRACTOR FOR A VEHICLE SEAT

(71) Applicant: Ford Global Technologies, LLC, Dearborn, MI (US)

(72) Inventor: Shannon Alan Anthony Buhagiar, Docklands (AU)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 16/555,088

(22) Filed: Aug. 29, 2019

(65) Prior Publication Data

US 2020/0086824 A1    Mar. 19, 2020

(30) Foreign Application Priority Data

Sep. 17, 2018    (CN) .......................... 201811081056.9

(51) Int. Cl.
| | |
|---|---|
| *B60R 22/195* | (2006.01) |
| *B60R 22/46* | (2006.01) |
| *B60R 22/22* | (2006.01) |
| *B60R 22/24* | (2006.01) |

(52) U.S. Cl.
CPC ...... *B60R 22/1951* (2013.01); *B60R 22/4604* (2013.01)

(58) Field of Classification Search
CPC . B60R 22/1951; B60R 22/4604; B60R 22/24; B60R 22/34; B60R 2022/3402; B60R 22/341; B60R 22/46; B60R 22/32
See application file for complete search history.

(56) References Cited

U.S. PATENT DOCUMENTS

| | | | |
|---|---|---|---|
| 5,566,978 A * | 10/1996 | Fleming | B60R 22/1951 188/377 |
| 6,832,782 B2 | 12/2004 | Mori | |
| 7,338,083 B2 | 3/2008 | Sakata | |
| 7,500,722 B2 | 3/2009 | Morris | |
| 7,607,508 B2 | 10/2009 | Zhao et al. | |
| 7,883,106 B2 | 2/2011 | Mical | |

(Continued)

FOREIGN PATENT DOCUMENTS

| | | | | |
|---|---|---|---|---|
| DE | 19714381 A1 * | 4/1998 | ............. | B60R 22/34 |
| EP | 2052922 A1 * | 4/2009 | ......... | B60R 22/1951 |
| JP | 2004352141 A | 12/2004 | | |

OTHER PUBLICATIONS

Machine translation of EP 2052922 A1obtained from dialogue. proquest.com Feb. 10 (Year: 2021).*

(Continued)

*Primary Examiner* — Paul N Dickson
*Assistant Examiner* — Maxwell L Meshaka
(74) *Attorney, Agent, or Firm* — David Coppiellie; Price Heneveld LLP

(57) ABSTRACT

A bracket for mounting an anchor pretensioner and a retractor for a vehicle seat is provided. The bracket comprises a first plate facing the anchor pretensioner, a second plate facing the retractor and a hollow spacer extending between the first and second plates, and connected to the first and second plates. The hollow spacer is configured to allow a fastener to pass through to connect the anchor pretensioner and the retractor to a vehicle body.

18 Claims, 7 Drawing Sheets

(56) References Cited

U.S. PATENT DOCUMENTS

2005/0023815 A1* 2/2005 Hoffmann ............... B60R 22/24
                                                          280/801.2

OTHER PUBLICATIONS

Machine translation of DE 19714381 A1 obtained from dialogue.proquest.com Feb. 10 (Year: 2021).*
"3 Point Retractable Installation Van Box Truck Seat Belts Bus Motorhome Seat Belt," Wesco Performance, www.wescoperformance.com/lg-sash-seatbelt-install.html, 5 pages, Apr. 6, 2018.

* cited by examiner

BRACKET FOR MOUNTING AN ANCHOR PRETENSIONER AND A RETRACTOR FOR A VEHICLE SEAT

FIELD OF THE INVENTION

The present invention generally relates to a bracket for mounting an anchor pretensioner and a retractor for a vehicle seat belt, and more particularly, a bracket to mount the anchor pretensioner and the retractor along a common axis.

BACKGROUND OF THE INVENTION

In a vehicle, a seat belt assembly typically includes a seat belt retractor fixed to a vehicle body at a position in the vicinity of a vehicle seat. The seat belt retractor stores a seat belt webbing and is generally configured to unwind and rewind the seat belt webbing for restraining an occupant of the vehicle. A terminal end of the seat belt webbing is usually connected to an anchor section that is fixed to the vehicle body. With the seat belt fastened, the retractor allows the withdrawal or retraction of the webbing. The seat belt assembly may further include a seat belt pretensioner to reduce loose webbing in the early stages of a crash. Among different types of pretensioners, an anchor pretensioner is designed to be attached to the anchor and pull the anchor down toward the floor to tighten the seat belt webbing. Conventionally, the anchor pretensioner is mounted on a vehicle floor using a dedicated bracket. The anchor pretensioner mounted on the vehicle floor can limit the space available for wiring bundles routed to different parts of the vehicle via the vehicle floor. In some conditions, the anchor pretensioner can clash with and cause wear on the wiring bundle. In some vehicles, additional brackets are used to support a load applied on the anchor pretensioner bracket due to the force vector resulting from the seat belt. Further, the retractor is often mounted to the vehicle pillar. Mounting the anchor pretensioner and the retractor separately involves at least two assembling steps and often requires separate brackets, which increases the cost and the assembling time. There is a need for a mounting bracket for anchor pretensioner and retractor which addresses the packaging issue and reduces the cost and assembling time.

SUMMARY OF THE INVENTION

According to a first aspect of the present disclosure, a bracket for mounting an anchor pretensioner and a retractor of a vehicle seat is provided. The bracket comprises a first plate facing the anchor pretensioner, a second plate facing the retractor and a hollow spacer extending between the first and second plates, and connecting the first and second plates. The hollow spacer is configured to allow a fastener to pass through to connect the anchor pretensioner and the retractor to a vehicle body.

In one embodiment, the first plate may include a first retention feature for connecting to the anchor pretensioner.

In another embodiment, the second plate may include a second retention feature for connecting to the retractor.

In another embodiment, the first retention feature may include a hole formed on the first plate to allow a connector to pass through. The connector may be used to connect the anchor pretensioner to the first plate.

In another embodiment, the second retention feature may include a clip positioned above an upper surface of the second plate. The clip may be of a U-shape and opens towards the retractor. The main surface of the clip may be substantially perpendicular to the second plate. The clip may be configured to be snapped onto a tab on the retractor.

In another embodiment, the first plate, the second plate and the hollow spacer may be integrally formed and made from a rigid component such as metal and hard plastic.

In another embodiment, the hollow spacer may be of a cylindrical shape and may have an inner surface. The cross-sectional area of the inner surface may be annular.

In another embodiment, a main area of the second plate may be smaller than a main area of the first plate.

In yet another embodiment, the first retention feature in the first plate may be spaced away from a projection of the second plate on the first plate.

In another embodiment, the hollow spacer may protrude from the second plate at a distance such that the second plate may be spaced away from the retractor at an assembled position.

According to another aspect of the present disclosure, a bracket assembly for mounting an anchor pretensioner and a retractor to a vehicle body is provided. The bracket comprises a first plate, a second plate and a hollow spacer extending in-between and connected to the first and second plates. The first plate includes a first retention feature for connecting to the anchor pretensioner. The second plate includes a second retention feature for connecting to the retractor. The hollow spacer is configured to allow a fastener to pass through to connect the anchor pretensioner and the retractor to a vehicle body.

In another embodiment, the fastener may be a bolt having a head, a shank and a distal portion. At an assembled position, the head may abut against an outer surface of an anchor pretensioner housing. The shank may extend through the spacer and the distal portion is connected to the vehicle body.

In another embodiment, the anchor pretensioner and the retractor may be mounted on a lower trim of a B-pillar.

In another embodiment, the anchor pretensioner and the first plate may be connected together by a connector. The first retention feature may be a hole formed on the first plate to allow the connector to pass through.

In another embodiment, the second retention feature may include a clip projecting away from the second plate to be connected to a tab on the retractor.

According to another aspect of the present disclosure, an anchor pretensioner and retractor assembly is provided. The anchor pretensioner and retractor assembly comprises a retractor positioned adjacent to a lower trim of the pillar, the anchor pretensioner is disposed opposite to the retractor and is positioned further away from the pillar, and a bracket is disposed between the retractor and the anchor pretensioner. The retractor includes a housing having a mounting wall. The bracket comprises a first plate facing the anchor pretensioner, a second plate facing the mounting wall of the housing of the retractor and a hollow spacer extending between the first and second plates and connected to the first and second plates. The hollow spacer includes an inner space to allow a fastener to pass through to mount the anchor pretensioner and retainer to the vehicle body.

In one embodiment, the first plate of the bracket may include a first retention feature to connect the first plate to the anchor pretensioner and the second plate may include a second retention feature to connect the second plate to the retractor.

In another embodiment, the first retention feature may be a hole formed on the first plate to allow passing through of a connector. The second retention feature may be a clip protruding from the second plate. The clip may have a U-shape with an opening toward the mounting wall of the retractor. The mounting wall may include an aperture and a tab located in the aperture. The clip may be snapped on the tab to connect the second plate to the retractor.

In another embodiment, the anchor pretensioner may include an elongated body extending along a longitudinal direction of the vehicle and a mounting portion having a first mounting hole. The retractor housing may include a second mounting hole under the aperture. The first mounting hole, the inner space in the hollow spacer and the second mounting hole are aligned along a common axis.

In another embodiment, the length of the hollow spacer may be configured to provide a clearance to allow the lower trim of the pillar extend through the anchor pretensioner and the bracket at a longitudinal direction. The anchor pretensioner may be disposed above a wiring bundle in the vehicle.

These and other aspects, objects, and features of the present invention will be understood and appreciated by those skilled in the art upon studying the following specification, claims, and appended drawings.

It should be noted that these figures are intended to illustrate the general characteristics of methods, structure and/or materials utilized in certain example embodiments and to supplement the written description provided below. These drawings may not be, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE PREFERRED EMBODIMENTS

The disclosed brackets for mounting an anchor pretensioner and a retractor of a vehicle seat belt will become better understood through review of the following detailed description in conjunction with the figures. The detailed description and figures provide merely examples of the various embodiments described herein. The person skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various brackets for mounting an anchor pretensioner and a retractor of a vehicle seat belt are provided. Related features in the examples may be identical, similar, or dissimilar in different examples. For the sake of brevity, related features may not be redundantly explained in each example. Instead, the use of related feature names will cue the reader that the feature with a related feature name may be similar or identical to the related feature in an example explained previously. Features specific to a given example will be described in that particular example. The reader should understand that a given feature need not be the same or similar to the specific portrayal of a related feature in any given figure or example.

Figure 1:
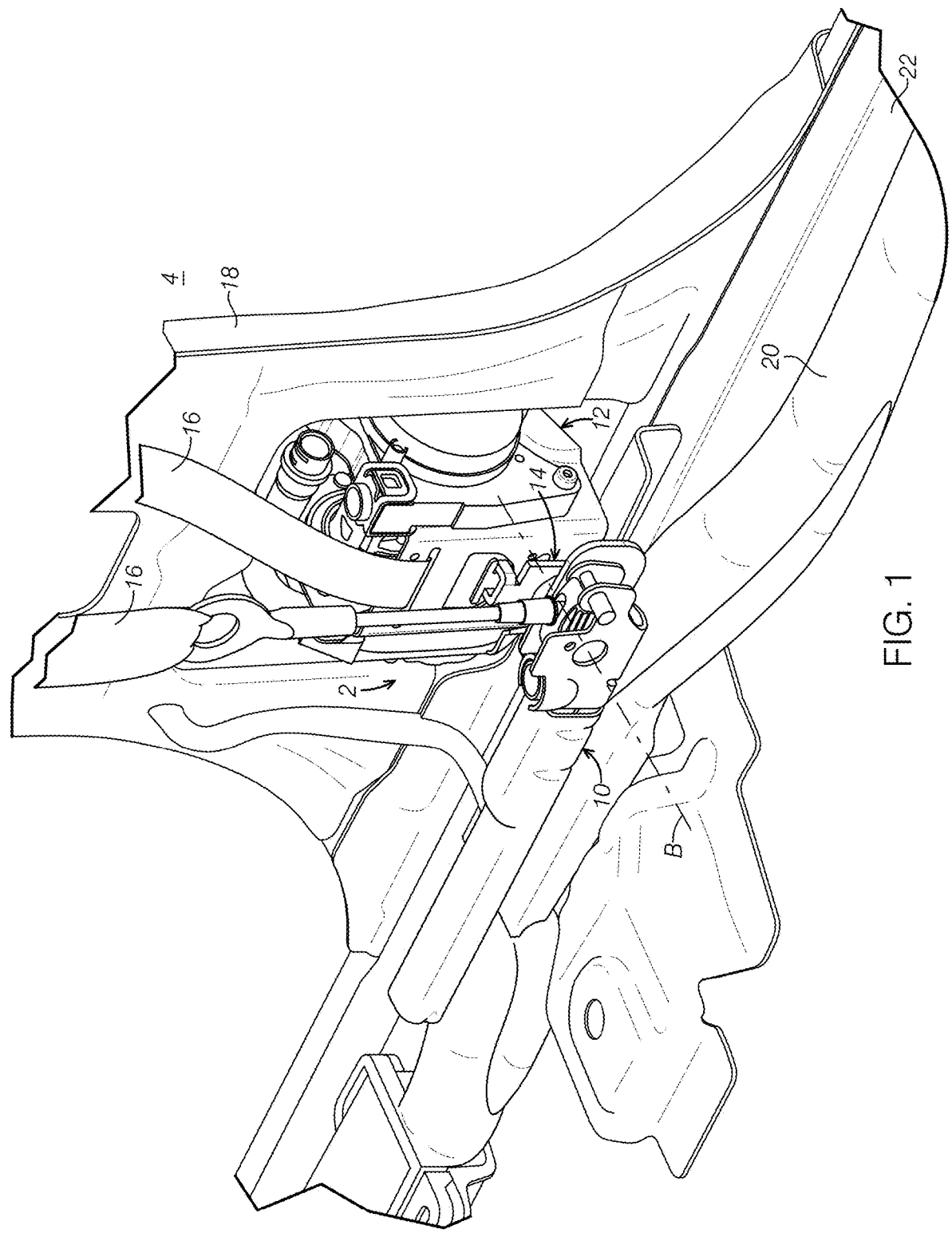
FIG. 1 is a perspective view of an anchor pretensioner and retractor assembly for a vehicle seat, according to one embodiment of the present disclosure.

Referring to FIG. 1, an anchor pretensioner and retractor assembly 2 for a seat of a vehicle 4 is illustrated, according to one embodiment of the present disclosure. The anchor pretensioner and retractor assembly 2 may include an anchor pretensioner 10, a retractor 12 and a bracket 14 disposed between the anchor pretensioner 10 and the retractor 12. The retractor 12 is used to store a seat belt webbing 16 and is configured to unwind and rewind the seat belt webbing 16 to restrain an occupant of the vehicle 4. One end of the seat belt webbing 16 is coupled to the anchor pretensioner 10. In some embodiments, the retractor 12 is disposed adjacent to a lower trim of a pillar 18 of the vehicle 4. In one embodiment, the anchor pretensioner and retractor assembly 2 is used for a driver seat, and the retractor 12 is disposed adjacent to a bottom of a B-pillar 18. In the depicted embodiment, the anchor pretensioner 10 is disposed opposite to the retractor 12 and further away from the pillar 18 of vehicle 4. The bracket 14 disposed between the anchor pretensioner 10 and the retractor 12 provides integrated mounting points along a common axis B. In this regard, the anchor pretensioner 10 and retractor 12 can be connected to a vehicle body via one assembling step. For example, the bracket 14 enables the mounting of the anchor pretensioner 10 and retractor 12 in a lower trim of B-pillar via one fastener. In an embodiment, the anchor pretensioner 10 and the retractor 12 are mounted to the lower trim of the vehicle pillar 18 above a wiring bundle 20 disposed in a vehicle floor 22. As the anchor pretensioner 10 and the retractor 12 are connected to the vehicle body via one bracket 14, the assembly 2 consumes less space compared to the assembly that utilizes dedicated brackets for an anchor pretensioner and a retractor, respectively. Further, the assembly 2 of the present disclosure is compact. The adverse impact condition between the anchor pretensioner and the wiring bundle 20 on the vehicle floor 22 can be avoided and there is no need to consider separate the packaging of the anchor pretensioner.

Further, the bracket 14 mounted to the lower trim of vehicle pillar 18 receives lesser load from the seat belt compared to the conventional pretensioner brackets mounted on the vehicle floor 18, thereby eliminating the need for additional brackets to support the load.

Further, mounting the anchor pretensioner 10 and retractor 12 via a single bracket 14 reduces material and assembling costs. For example, mounting the anchor pretensioner 10 and retractor 12 along a common axis to a vehicle body can be achieved using one fastener, and thus generally reduces the number of components that are required. In some embodiments, the anchor pretensioner 10 and the retractor 12 may be supplied together with the bracket 14 as a module. That is, the anchor pretensioner 12 and the retractor 14 are preassembled to the bracket 14. The preassembled assembly 2 is then mounted to the vehicle body along a common axis, which further reduce the assembling time at the vehicle assembling plant.

Figure 2:
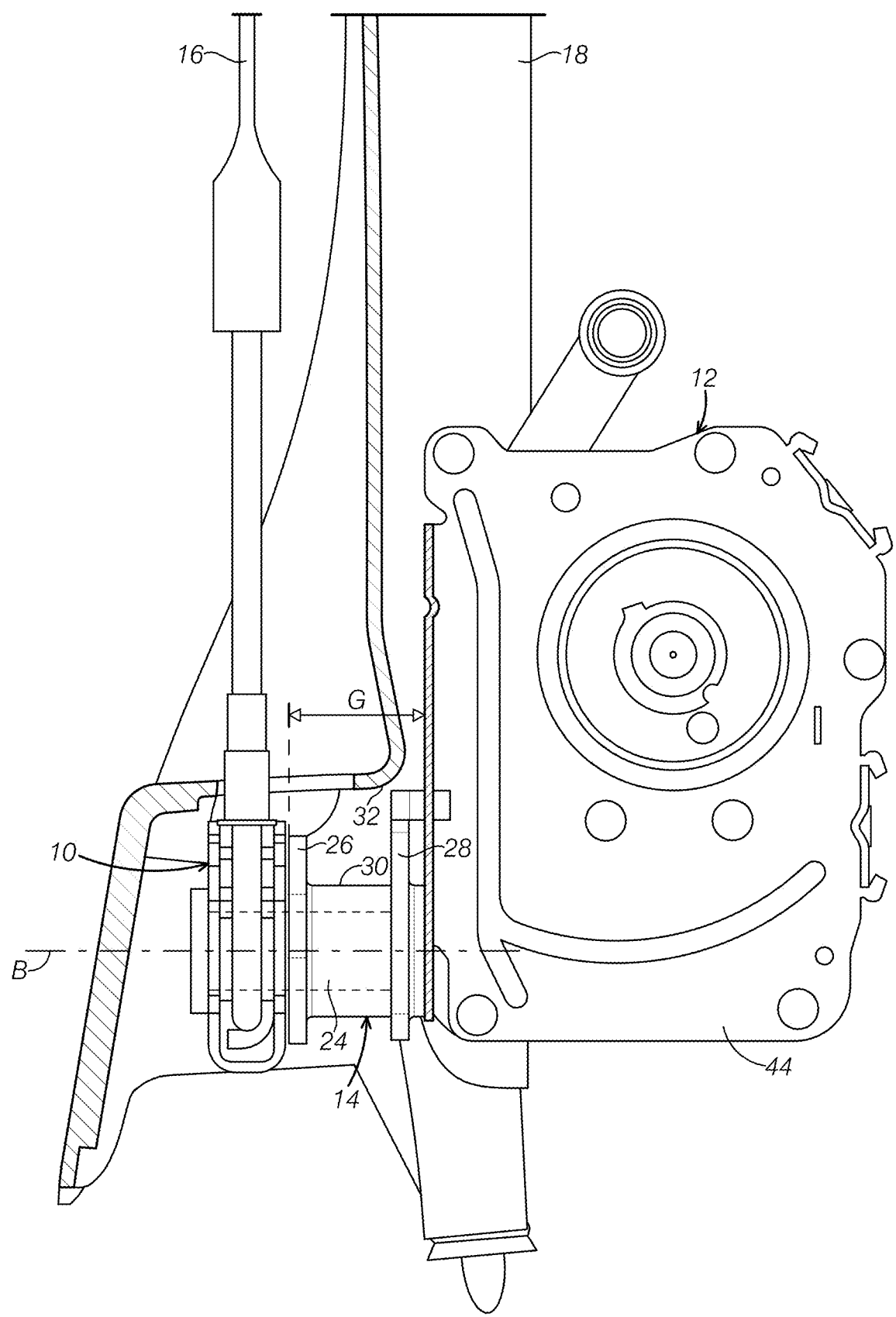
FIG. 2 is a cross-sectional view of the anchor pretensioner and retractor assembly in FIG. 1, illustrating the anchor pretensioner and retractor assembly connected to a pillar of a vehicle, according to one embodiment of the present disclosure.
Figure 3:
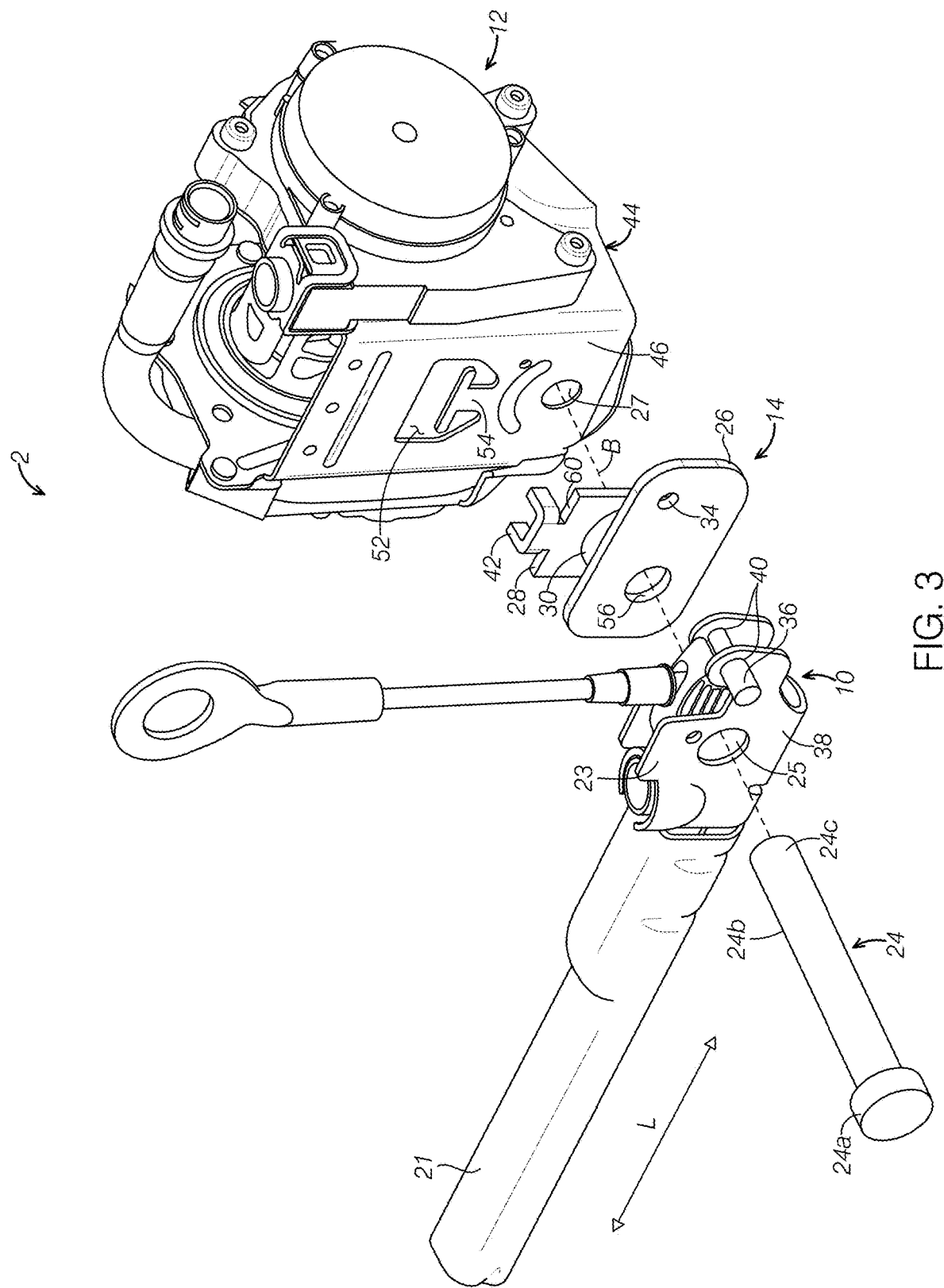
FIG. 3 is an exploded view of the anchor pretensioner and retractor assembly, according to one embodiment of the present disclosure.
Figure 4:
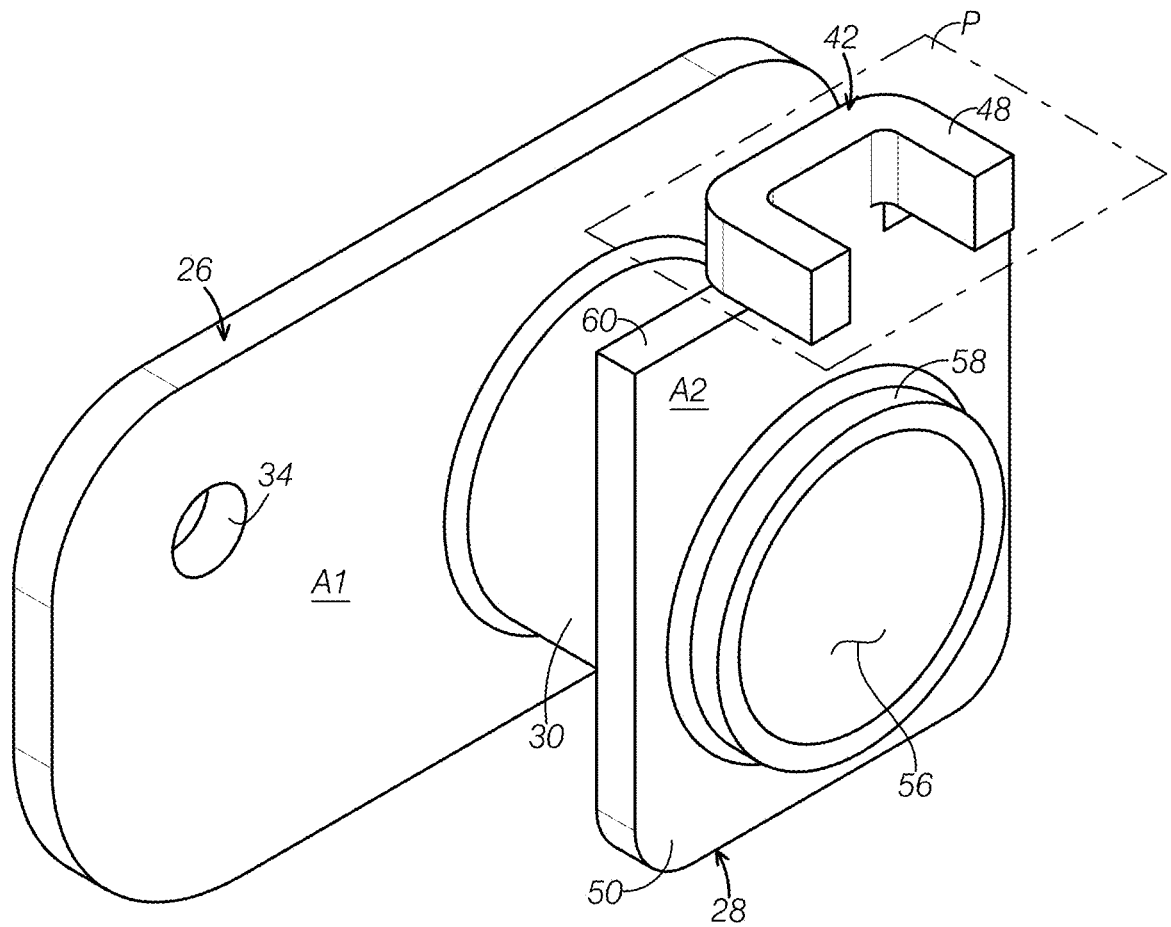
FIG. 4 is a perspective view of the bracket for mounting an anchor pretensioner and a retractor according to one embodiment of the present disclosure.
Figure 5:
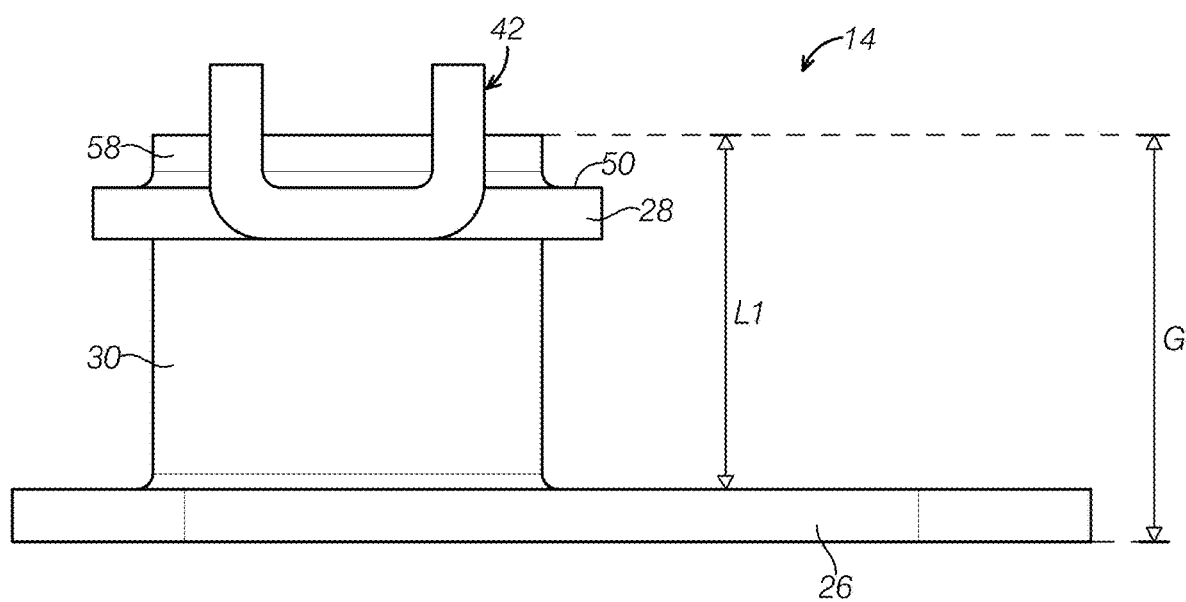
FIG. 5 is a top view of the bracket for mounting an anchor pretensioner and a retainer shown in FIG. 4.
Figure 6:
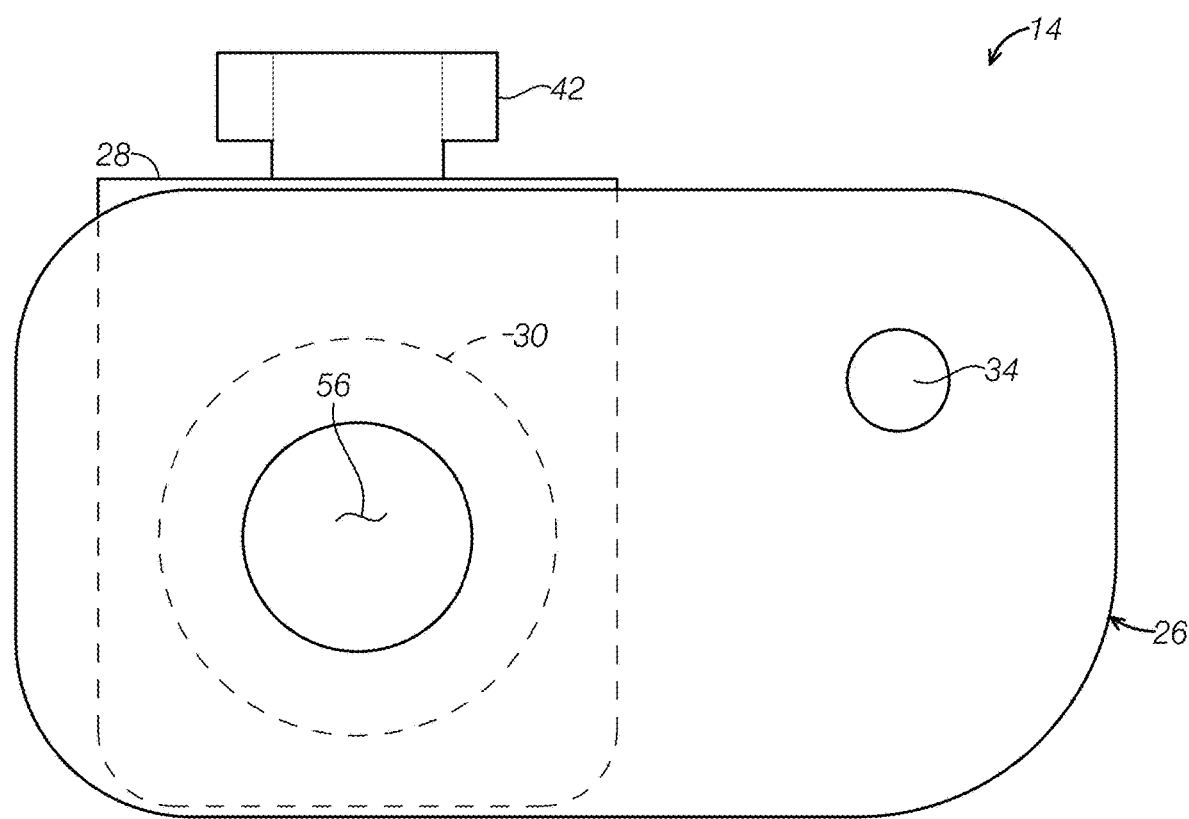
FIG. 6 is a front view of the bracket for mounting an anchor pretensioner and a retainer of the vehicle seat shown in FIG. 4.
Figure 7:
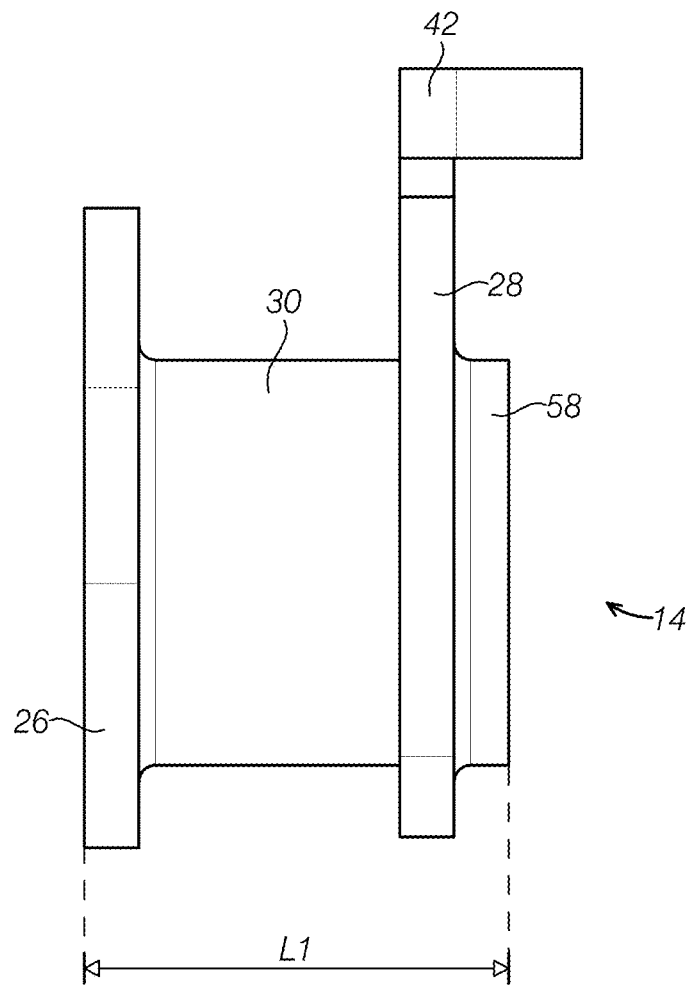
FIG. 7 is a bottom view of the bracket for mounting an anchor pretensioner and a retainer of the vehicle seat shown in FIG. 4.

Referring to FIGS. 2 and 3, FIG. 2 shows a cross-sectional view of the anchor pretensioner and retractor assembly 2 and the pillar 18 in FIG. 1, illustrating an interface of the assembly 2 to the pillar 18. FIG. 3 is an exploded view of the anchor pretensioner and retractor assembly 2. As shown in FIG. 3, the anchor pretensioner 10 includes an elongated body 21 extending along a longitudinal direction L of the vehicle and a mounting portion 23. As shown in FIGS. 2 and 3, the anchor pretensioner and retractor assembly 2 further comprises a fastener 24. A bracket assembly for mounting the anchor pretensioner and the retractor may include the bracket 14 and the fastener 24. The bracket 14 may include a first plate 26 adjacent and facing the anchor pretensioner 10, a second plate 28 adjacent to and facing the retractor 12 and a spacer 30 between the first plate 10 and the second plate 28. The fastener 24 may include any appropriate connectors such as a screw bolt. For example, the fastener 24 may include a head 24a, a shank 24b and a distal portion 24c. In an assembled state, a first mounting hole 25 on the mounting portion 23 of the anchor pretensioner 10, the inner space 56 of the spacer 30 and a second mounting hole 27 on the retractor housing 44 are aligned along an axis B. The head 24a of the fastener 24 abuts against an outer surface of the mounting portion 23 of the anchor pretensioner 10. The shank 24b of the fastener 24 extends through the first mounting hole 25 on the mounting portion 23 of the anchor pretensioner 10, the inner space 56 of the spacer 30 and the second mounting hole 27 on the retractor housing 44. The distal end 24c of the fastener 24 is connected to the pillar 18.

The anchor pretensioner and retractor assembly 2 has integrated mounting points. That is, the mounting points are aligned substantially along the axis B such that a single fastener enables the connection of both anchor pretensioner and retractor to the vehicle body. For example, the fastener 24 can extend along the axis B that passes through the anchor pretensioner and retractor assembly 2 to connect them to the pillar 18. In some embodiments, the anchor pretensioner 10 and the retractor 12 are preassembled to the bracket 14 as a module. The anchor pretensioner 10 and the retractor 12 can be assembled to the pillar 18 by simply passing the fastener 24 through the holes in the anchor pretensioner 10, the bracket 14, the retractor 12 and pillar 18, and then tightening the fastener 24.

Referring to FIGS. 4-7, FIGS. 4-7 show the bracket 14 for mounting the pretensioner 10 and the retractor 12 according to one embodiment of the present disclosure. In some embodiments, the bracket 14 includes a first plate 26, a second plate 28 and a hollow spacer 30. The hollow spacer 30 extends between the first plate 26 and second plate 28, and is connected to the first and second plates 26, 28. With further reference to FIGS. 1-3, the first plate 26 faces the anchor pretensioner 10 and the second plate 28 faces the retractor 12. The hollow spacer 30 includes an inner space 56 to allow the fastener 24 to pass through. In some embodiments, the second plate 28 is substantially parallel to the first plate 26.

Referring back to FIG. 2, a clearance G between the anchor pretensioner 10 and the retractor 12 is provided such that a lower trim 32 of the pillar 18 can go over the anchor pretensioner 10 and the bracket 14. In one embodiment, the clearance G equals a thickness of the bracket 14 at a direction substantially parallel to the axis B, for example, a sum of thickness of the first plate 26, the thickness of second plate 28, and a length of the spacer 30. In another embodiment, the spacer 30 protrudes from the second plate 28 and the clearance G equals about a sum of thickness of the first plate 26 and a length of the spacer 30. To accommodate such need, a length L1 of the spacer 30 is configured to create clearance G between the anchor pretensioner 10 and the retractor 12 while making the anchor pretensioner 10 closer to the retractor 12 as desired. The shorter clearance G makes the assembly 2 more compact and consumes less space in the vehicle.

Referring to FIGS. 4-7, in some embodiments, the first plate 26 of the bracket 14 includes a first retention feature 34 to connect the first plate 26 to the anchor pretensioner 10. In the depicted embodiment, the first retention feature 34 is a hole formed on the first plate 26 and the hole is configured to receive a connector 36 as shown in FIG. 3. The mounting portion 23 of the anchor pretensioner 10 may include one or more holes 40, such as two aligned holes, corresponding to and aligned with the hole 34 in the first plate 14 such that the first plate 26 and the anchor pretensioner 10 are connected by passing the connector 36 through the hole 34 in the first plate 26 and the holes 40 in the pretensioner housing 38. In another embodiment, the first retention feature 34 may be a pin protruding from an outer surface of the first plate 26 and configured to snap into a hole in the mounting portion 23 of the anchor pretensioner 10. The first retention feature 34 can restrict a rotational movement of the anchor pretensioner 10 with respect to the bracket 16. The bracket 14 integrates the anchor pretensioner 10 and the retractor 12 and enables a robust anti-rotation feature. The connection of the anchor pretensioner 10 and the retractor 12 further enhances the anti-rotation feature of the bracket 14. It should be appreciated that the first retention feature 34 may be any one or more appropriate features for connecting with a corresponding feature on the anchor pretensioner 10.

Referring to FIGS. 3-7, in some embodiments, the second plate 28 may include a second retention feature 42 to connect the second plate 28 to a retractor housing 44. In the depicted embodiment, the second retention feature 42 is a clip protruding away from the second plate 28. The clip 42 may have a U-shape with an opening oriented towards a mounting wall 46 of the retractor housing 44. A main surface 48 of the clip 42 is arranged substantially perpendicular to an outer surface 50 of the second plate 28. The main surface 48 of the clip 42 is a surface in a plane P substantially perpendicular to the outer surface 50 of the second plate 28. The mounting wall 46 faces the bracket 14 and may include an aperture 52 and a tab 54 located in the aperture 52. In the depicted embodiment, the aperture 52 is disposed above the second mounting hole 27 on the mounting wall 46. The clip 42 may be snapped on the tab 54 to connect the second plate 28 to the retractor housing 44. Alternatively, the second retention feature 42 may be a tab to be snapped into a clip feature on the retractor housing. It should be appreciated that the second retention feature 42 may be any one or more appropriate features for connecting with a corresponding feature on the retractor housing 44.

In some embodiments, the bracket 14 may be made of rigid material such as metal, or hard plastic. In some embodiments, the first plate 26, the second plate 28 and the spacer 30 may be made from plastic and integrally formed by an injection molding process. In some embodiments, the first plate 26, the second plate 28 and the spacer 30 may be made from metal and integrally formed by an extruding process. In yet another embodiment, the first plate, the second plate and the spacer may be individually made and connected together by any appropriate connections such as welding.

The hollow spacer 30 of the bracket 14 includes an inner space 56 to receive the fastener 24. In some embodiments, the hollow spacer 30 has a cylindrical shape and a cross section of the inner space is annular and configured to receive the fastener 24 and allow certain manipulation to align the mounting points of the anchor pretensioner 10, the bracket 14 and the retractor 12 substantially along the axis B. In some embodiments, an end portion 58 of the hollow spacer 30 may protrude from the outer surface 50 of the second plate 28 at a predetermined distance such that the second plate 28 is spaced away from the retractor 28 in an assembled state. A clearance between the second plate 28 and the retractor 12 can facilitate assembling of the bracket 14 to the retractor and reduce wear that would occur due to direct contact between the second plate 28 and the retractor 12.

In some embodiments, the second plate 28 is substantially parallel to the first plate 26 and a main area A2 of second plate 28 is smaller than a main area A1 of the first plate 26. Further, the first retention feature 34 in the first plate 26 is spaced away from a projection of the second plate 28 on the first plate 26 to facilitate the preassembling of the bracket 14 to the anchor pretensioner 10 and the retractor 12. The projection of the second plate 28 on the first plate 26 is shown as dash line in FIG. 6. In the depicted embodiment, the second retention feature 42 or the clip 42 is disposed above an upper surface 60 of the second plate 28. It should be appreciated that that first retention feature and the second retention feature may be positioned at any appropriate positions on the first and second plates, respectively to adapt the pretensioner housing and retractor housing in various configuration.

The bracket of the present disclosure enables mounting of the anchor pretensioner and the retractor along a common axis and integrates the anchor pretensioner and the retractor in one bracket. In this way, the anchor pretensioner and the retractor assembly occupies less space and can simplify the packaging. Further, mounting both the anchor pretensioner and retractor assembly to a vehicle body with one bracket can reduce material cost and assembling time.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A bracket for mounting an anchor pretensioner and a retractor for a vehicle seat, comprising:
    a first plate configured to face the anchor pretensioner;
    a second plate configured to face the retractor; and
    a hollow spacer extending between the first and second plates and connecting the first and second plates, wherein the hollow spacer is configured to allow a fastener to pass through to connect the anchor pretensioner and the retractor to a vehicle body, wherein the first plate, the second plate and the hollow spacer are integrally formed and made from metal or hard plastic.

2. The bracket of claim 1, wherein the first plate includes a first retention feature for connecting to the anchor pretensioner.

3. The bracket of claim 2, wherein the second plate includes a second retention feature for connecting to the retractor.

4. The bracket of claim 3, wherein the first retention feature includes a hole formed on the first plate to allow a connector to pass through to connect the anchor pretensioner to the first plate.

5. The bracket of claim 4, wherein the second retention feature is a clip positioned above an upper surface of the second plate and the clip has a U-shape opening toward the retractor, and a main surface of the clip is substantially perpendicular to the second plate, and wherein the clip is configured to be snapped onto a tab on the retractor.

6. The bracket of claim 5, wherein the hollow spacer has a cylindrical shape and an area of an inner surface is annular.

7. The bracket of claim 6, wherein a main area of the second plate is smaller than a main area of the first plate.

8. The bracket of claim 7, wherein the first retention feature in the first plate is spaced away from a projection of the second plate on the first plate.

9. The bracket of claim 7, wherein an end portion of the hollow spacer protrudes from the second plate at a distance such that the second plate is spaced away from the retractor at an assembled position.

10. A bracket assembly for mounting an anchor pretensioner and a retractor of a seat to a vehicle body, comprising:
    a bracket comprising:
        a first plate having a first retention feature for connecting to the anchor pretensioner;
        a second plate having a second retention feature for connecting to the retractor and substantially parallel to the first plate; and
        a hollow spacer extending between the first and the second plates and connected to the first and second plates; and
    a fastener configured to mount the anchor pretensioner and a retainer to the vehicle body, wherein the hollow spacer is configured to allow the fastener to pass through to connect the anchor pretensioner and the retractor to the vehicle body, further comprising a connector to connect the anchor pretensioner with the first plate, wherein the first retention feature is a hole formed on the first plate to allow the connector to pass through.

11. The bracket assembly of claim 10, wherein the fastener is a bolt having a head, a shank and a distal portion, wherein at an assembled position, the head abuts against an outer surface of an anchor pretensioner housing; and the shank extends through the spacer, and the distal end is connected to the vehicle body.

12. The bracket assembly of claim 10, wherein the anchor pretensioner and a retractor are mounted on a lower trim of a B-pillar.

13. The bracket assembly of claim 11, wherein the second retention feature includes a clip projecting away from the second plate to be connected to a tab on the retractor.

14. An anchor pretensioner and retractor assembly for a seat of a vehicle, comprising:
   a retractor positioned adjacent to a lower trim of a pillar, wherein the retractor includes a housing having a mounting wall;
   an anchor pretensioner opposite the retractor and positioned further away from the pillar; and
   a bracket disposed between the retractor and the anchor pretensioner, wherein the bracket comprises:
      a first plate facing the anchor pretensioner;
      a second plate substantially parallel to the first plate and facing the mounting wall of the housing of the retractor; and
      a hollow spacer extending between the first and the second plates and connected to the first and second plates; and
   a fastener passing through an inner space in the hollow spacer to mount the anchor pretensioner and a retainer to the vehicle body.

15. The anchor pretensioner and retractor assembly of claim 14, wherein the first plate of the bracket further comprises a first retention feature to connect the first plate to the anchor pretension and the second plate further comprises a second retention feature to connect the second plate to the retractor.

16. The anchor pretensioner and retractor assembly of claim 15, wherein the first retention feature is a hole formed on the first plate to allow passing through of a connector, wherein the second retention feature is a clip protruding from the second plate, the clip has a U-shape with an opening toward the mounting wall of the retractor, wherein the mounting wall includes an aperture and a tab located in the aperture and wherein the clip is snapped on the tab.

17. The anchor pretensioner and retractor assembly of claim 16, wherein the anchor pretensioner includes an elongated body extending along a longitudinal direction of the vehicle and a mounting portion having a first mounting hole, wherein the retractor housing includes a second mounting hole under the aperture, and wherein the first mounting hole, the inner space in the hollow spacer and the second mounting hole are aligned along a common axis.

18. The anchor pretensioner and retractor assembly of claim 17, wherein a length of the hollow spacer is configured to provide a clearance to allow a lower trim of the pillar to extend through the anchor pretensioner and the bracket at a longitudinal direction, and wherein the anchor pretensioner is disposed above a wiring bundle in the vehicle.

* * * * *

UNITED STATES PATENT AND TRADEMARK OFFICE
CERTIFICATE OF CORRECTION

PATENT NO. : 11,034,326 B2
APPLICATION NO. : 16/555088
DATED : June 15, 2021
INVENTOR(S) : Buhagiar Page 1 of 1

It is certified that error appears in the above-identified patent and that said Letters Patent is hereby corrected as shown below:

In the Claims

Column 9:
Claim 13, Line 13:
"claim 11" should be --claim 10--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*